Figure 1:
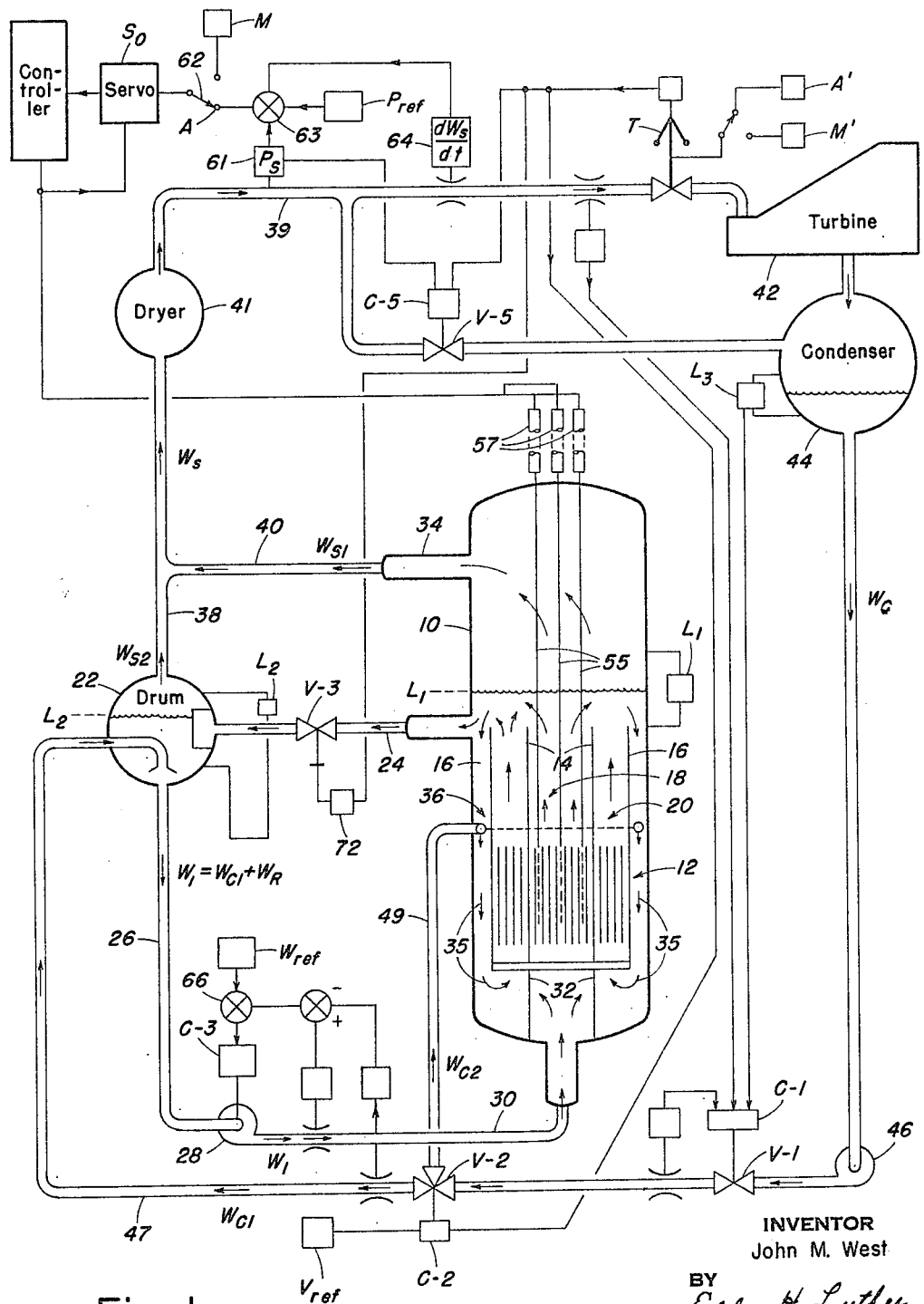

Fig. I.

United States Patent Office 3,284,312
Patented Nov. 8, 1966

3,284,312
BOILING WATER NUCLEAR REACTOR
ORGANIZATION
John M. West, Dunedin, Fla., assignor, by mesne assignments, to Combustion Engineering, Inc., a corporation of Delaware
Filed Oct. 9, 1959, Ser. No. 845,531
30 Claims. (Cl. 176—56)

The invention relates to nuclear reactors and has particular relation to reactors of the boiling water type.

In boiling water nuclear reactors there is provided a core which includes nuclear fuel (fissionable material) with there being vertically disposed channels in the core for the disposition and passage of a cooling fluid and with there being means to control the reactivity of the reactor. This is conventional and well known and in the operation of the reactor the fluid or coolant boils so that a vapor is generated with the vapor being conveyed from the container or vessel that houses the core and transported to a desired point of use and with the cooling fluid being circulated through the core by means of a suitable circulating system. Light or heavy water is generally employed as the coolant although other suitable liquids may be employed and the terms "coolant" and "water" as employed herein are intended to include all such suitable liquids.

For low power or small reactors of the boiling water type natural circulation is entirely satisfactory as the system or means for circulating the water or cooling fluid through the reactor and because of simplicity is the desirable system for these reactors. As the power output of the reactor increases, however, it becomes necessary to make compromises in reactor design in order to avoid the use of pumps for forcing cooling water through the core. These compromises in the form of larger pressure vessel, lower specific power, longer exposure of fuel to corrosion, lower conversion ratio, more shielding, larger containment vessels, etc., have serious economical consequences, so that for large reactors with high power outputs it is advantageous to employ forced circulation of the water through the reactor, notwithstanding the additional cost and inconvenience attributable to forced circulation loops. The gains in performance and savings of other capital and operating costs more than offset these undesirable factors. There is a broad intermediate range between the small natural circulation boiling water reactors and the very large forced circulation boiling water reactors wherein both natural circulation and forced circulation as the sole circulating system for the reactor have definite undesirable features that unduly complicate the reactor design or make it unnecessarily uneconomical.

The present invention is concerned with an improved boiling water reactor system employing a combination of natural and forced circulation with these two circulating systems being employed in portions of the core where they may be most advantageously utilized with relation to existing operating characteristics.

It is an inherent characteristic of these reactors that there is a much greater heat output from the fuel located near the center of the core than from that located near the radial periphery. Therefore, in accordance with the invention, a forced circulation of the water is provided at the center of the core while a natural circulation is provided through the region surrounding this central portion. Since the central portion is the zone of the core which has a large power output the forced circulation through this zone will provide adequate cooling and the reactor designer will be assured that such adequate cooling will be produced. However, since the portion of the core disposed about this central region has a much lower output, forced circulation is not necessary for adequate cooling in this region and natural circulation may advantageously be utilized, thereby reducing the forced circulation requirements and providing a more economical organization. This forced-natural circulation combination will provide a much more economical system for reactors of intermediate and large sizes.

Additionally, in accordance with the present invention, there is a dual separation of the water and steam, i.e., separation in the vessel of the reactor and additional separation in a steam and water drum which forms part of the circulating system in accordance with the invention. Thus the invention assures circulation through the various portions of the reactor core in the required amounts and alleviates the steam-water separation problem with these being two of the greatest uncertainties in boiling water reactor system design and with these problems being resolved in the invention in an economical manner.

Also provided with and forming part of the reactor system of the invention is a control organization which, in addition to control rods, controllably introduces the feed water into the reactor organization in a manner to control the power output thereof.

Accordingly, it is an object of this invention to provide an improved boiling water reactor system.

Other and further objects of the invention will become apparent to those skilled in the art as the description proceeds.

Figure 2:
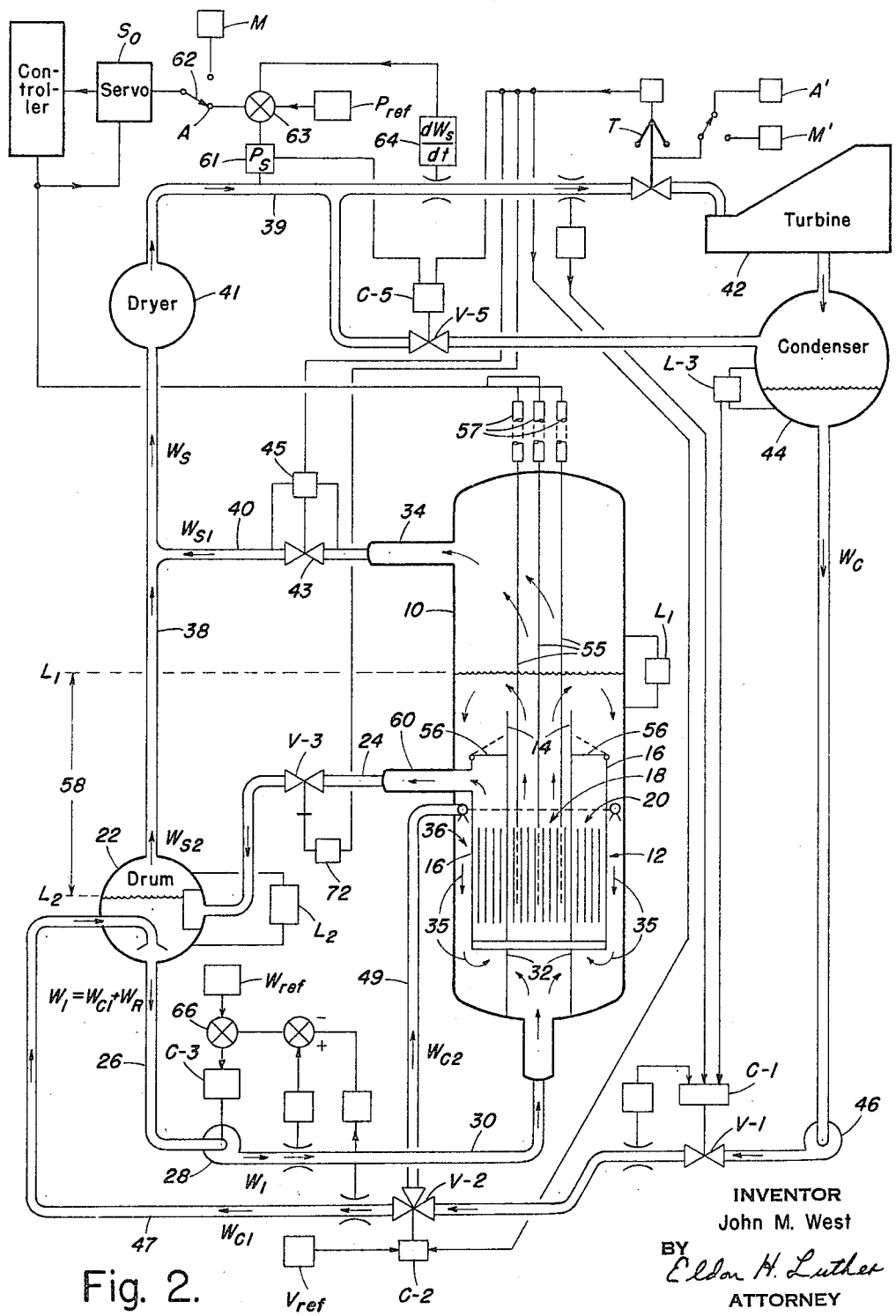

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein:

FIG. 1 is a schematic representation diagrammatically showing one embodiment of the invention; and FIG. 2 is a similar showing but depicting a modified embodiment.

Referring now to the drawings, wherein like reference characters are used throughout to designate like elements, the organization of FIG. 1 includes reactor pressure vessel 10 within which is mounted core 12 that may be made of a large number of vertically disposed, clad fuel rods that are assembled into a number of fuel assemblies with these assemblies, in turn, being assembled into the core. The fuel rods are spaced so as to provide vertical flow channels for cooling water therebetween and the core may have any desired transverse section configuration. Suitable baffles or the like, 14 and 16, divide the core into a vertically disposed central region 18 which is surrounded by an outer annular or peripheral region 20. Laterally spaced from pressure vessel 10 is steam and water or separator drum 22 which receives steam and water from the vessel through conduit 24. Extending down from drum 22 is conduit 26 which is connected with pump 28, this pump being provided with a variable speed drive and supplying water to the lower end of vessel 10 through conduit 30. The water entering vessel 10 through conduit 30 is directed up through the central region or passage 18 by means of baffle or duct 32 with this duct preventing this water from passing up around this central region 18 or up through outer region 20 but rather requiring all of the water from conduit 30 to pass through passage 18. Since this passage 18 occupies the central portion of the core, which is the portion of greatest power generation, this forced circulation through this central portion insures adequate cooling and distribution of the water with the steam being generated as the water traverses this portion of the core. Upon emerging from passage 18 the steam thus generated passes up through the upper end of the pressure vessel and out outlet 34.

The core 12 is disposed within pressure vessel 10 so that there is provided an annulus or peripheral downcomer passage 36 about the core and between the core and the vessel wall. This annulus acts as a downcomer for water in the vessel with the water flowing as indicated by the arrows 35 down therethrough and up through the region 20 with this circulation in this region being by natural circulation, i.e., the difference in density between the steam and water mixture in the region 20 and the water in the annulus 36. Some of the steam generated by traversal of the water over the fuel elements in region 20 passes up through the upper end of vessel 10 and out through outlet 34 while the remaining steam together with a substantial amount of water passes from vessel 10 through conduit 24 to steam and water drum 22 which may be of conventional design as employed in boiler practice and wherein the steam is separated from the water with the steam leaving drum 22 through conduit 38 which connects with conduit 40 extending from outlet 34. The steam flow from outlet 34 is identified as $W_{s1}$ and that from drum 22 as $W_{s2}$, with the combined flow being identified as $W_s$. This steam passes through drier 41, which may be of any known design and is supplied through conduit 39 to a suitable user which is shown as turbine or other prime mover 42. Upon leaving turbine 42 the steam passes through the condenser 44 with the condensate being pumped by pump 46 back into drum 22 through conduit 47, for recirculation through the core of the reactor and with the condensate, which comprises the feedwater to the reactor being well below saturation temperature.

As illustratively shown, a portion of this condensate may be introduced through conduit 49 into downcomer annulus 36 rather than being returned to drum 22. This introduction of feedwater into downcomer 36 tends to lower somewhat the temperature of the liquid in the downcomer and accordingly decreases the steam void content in the second pass or region 20. The proportioning of the condensate delivery or feed to drum 22 and downcomer 36 is controlled through a system, in a manner and for the purpose described hereinafter.

It will thus be seen by means of the dual circulating arrangement that a positive or forced circulation is provided through the central region of the core where a high power output prevails, with a natural circulation being provided in the region of the core where the power output is relatively low. Accordingly forced and natural circulation systems are employed in the locations where their use is most advantageous while at the same time the greatest system economy is provided. Moreover, it is unnecessary to compromise in core design with this system of the invention since a positive circulation is provided where inadequate natural circulation would dictate such a compromise and while natural circulation is provided where it gives adequate cooling and water distribution without any compromise in the design of the core.

The organization of FIG. 2 is generally similar to that of FIG. 1 except, that in lieu of having the outer peripheral region 20 open at its upper end to the interior of vessel 10, this peripheral region is closed by cover member 56. By means of this arrangement drum 22 may be lowered as compared with its position of FIG. 1 where the liquid level in the drum and that in pressure vessel 10 may be very close to each other. With the FIG. 2 organization, drum 22 may be lowered as shown so that a head of water 58 between the level L1 and L2 is effective to supplement the natural circulation through the outer peripheral portion 20 of core 12. The cover members 56 are preferably hinged so that they may be moved to an upright position allowing access to the core for removal of fuel elements therefrom. The cover members need not provide perfect seals since any small amount of leakage past these members is of no consequence and these cover members are retained in their closed position by means of the pressure differential which exists on opposite sides of them during operation of the reactor system.

The operation of the organization of FIG. 2 is the same as that of FIG. 1 with water from pump 28 being forced exclusively up through the central passage or region 18 of the core where a portion of this water is converted to steam with the steam passing through outlet 34. Water passes down through annulus 36 and up through the outer peripheral portion or region 20 of the core with the steam and water mixture that is had at the upper end of this region passing out through outlet 60 which extends from this region and down through conduit 24 to steam and water drum 22. The introduction of feed water into downcomer annulus 36 in this embodiment decreases the amount of water pump 28 must handle as well as decreasing the steam void content of the second pass.

In addition to supplementing the natural circulation through the outer peripheral portion 20 by the head of water 58, or in lieu thereof, this circulation may be supplemented by an adequate pressure drop through conduit 34. In order that the desired pressure drop may be had and maintained, an orifice 43 is provided in conduit 40. This orifice may be fixed, manually regulated, or automatically regulated to provide a pressure drop which increases with stream flow ($W_{s1}$), thereby enhancing the circulation of water through the second pass. If this orifice is automatically regulated it is adjusted by control device 45 to provide a predetermined pressure drop with relation to load on the system, or in other words, demand of the turbine. One of the advantages of employing this pressure drop to supplement the natural circulation through peripheral portion 20 is that drum 22 can then be placed at any desired elevation. It would not be necessary to locate the drum below the water level in the reactor, and, by raising the drum, additional head can be provided at the forced circulation pump 28 inlet if desired.

Accordingly, the organization of FIG. 2 as well as the organization of FIG. 1 provides a dual circulation system particularly concerned with a boiling water reactor and which provides a highly efficient and economic arrangement. The advantages of this organization may be readily appreciated when a comparison of the natural and forced circulation systems with regard to boiling water reactors is analyzed.

Some of the advantages of natural circulation systems are:

(1) No expense for pumps, pipes, valves, instrumentation, shieldings, etc. required for forced circulation loops.

(2) No necessity for holding down the fuel elements to prevent their being lifted by pressure-drop forces present in forced circulation reactors.

(3) No maintenance of circulating equipment.

(4) No dependence on an electric power source.

(5) No necessity for confining flow channels.

(6) No radioactive coolant circuits to be shielded.

(7) No contamination of coolant circuits with radioactive deposits.

Some of the disadvantages of a natural circulation system relative to a forced circulation system are:

(1) Performance is less predictable.

(2) More chance of instability.

(3) Fuel assemblies must be designed for low pressure drop. The reactor therefore, has a lower specific power and lower conversion ratio.

(4) Power distributions are disturbed by the steam void distributions which occur naturally.

(5) The amount of reactivity held in steam voids must be high if the power density is to be acceptable. This could get to be a safety problem as well as a control problem.

(6) Because of the lower power density, the pressure vessel must be larger and more expensive. There is also a greater expense for control mechanisms and shielding.

(7) The greater quantity of water and fuel in a natural circulation reactor requires that the gastight containment vessel be either larger or designed for higher pressure.

(8) Greater sensitivity to transient conditions such as changes in electric load demand.

(9) Low specific power requires that the fuel remain in the hot water longer in order to reach a given integrated exposure. The longer fuel lifetime increases use charges and increases the probability of fuel failures.

(10) Mechanical steam-water separators cannot be used because of the prohibitive pressure drop.

The disadvantages of natural circulation with regard to a central region of the core are obviated by forced circulation in the region while the advantages of natural circulation are realized at the outer region of the core where forced circulation is not required. The outer region of a boiling water reactor core operates at a relatively low power density and low specific power. Neither fuel center line temperature nor steam-void accumulation represents a serious problem in this region. $UO_2$ fuel rods can be of large diameter and be widely spaced to enhance natural circulation. It is important to note that this type of fuel design does not sacrifice anything in either conversion ratio or heat output performance.

The center of a reactor core normally operates at a power density much higher than the outer region. If large diameter widely spaced $UO_2$ fuel rods were used in this region, as has just been proposed for the radial periphery of the core, the melting point of the $UO_2$ would be exceeded. Furthermore, if natural circulation were used, the accumulation of steam voids would represent a large amount of reactivity and would tend to make the reactor unstable from a combination of hydraulic and reactivity effects. To transfer the heat from the fuel rods without exceeding their melting point, the number of rods must be increased, their diameter reduced, and the rods placed closer together. When this is done, the pressure drop through the core is increased to such as extent that natural convection will not provide enough cooling water. Thus natural circulation and high power density tend to be incompatible. This problem with regard to the central region of the core is overcome by the use of forced circulation in this central region, with the forced circulation providing adequate cooling without compromising the design of the core in any way and using the best design from a neutron standpoint. The central region generally represents ¼ to ½ of the total transverse area of the core, depending upon details of the particular core.

Embodied in and forming part of the reactor system of FIGS. 1 and 2 is a control organization or system for controlling the power output of the reactor, the various liquid levels in the system, the circulation rate, etc.

In a boiling water reactor, changes in reactivity, and thus changes in power level, are principally caused by:

(1) Changes of the volume fraction of steam in the reactor core.

(2) Changes of the average moderator water temperature.

(3) Changes of the position of control rods.

(4) Accumulation of nuclear poisons.

(5) Burnup of fuel.

Accumulation of nuclear poisons and fuel burnup are long-term reactivity changes which cannot be used for output power control. Also, since the greatest fraction of the excess reactivity is controlled by the steam voids in the core, changes of the average moderator water temperature by varying the reactor pressure will normally not be used for controlling the power demand. The two major methods that can be used are control of the average core void fraction or repositioning of the control rods.

In accordance with the invention, the power is automatically controlled as a function of the power demand over a relatively wide, predetermined range, as for example, from 100 to 40% of full power. To maintain the conversion ratio in the reactor, it is preferable to change power by controlling the voids in the core instead of moving control rods. Normally, direct cycle reactors are quite limited in their use of void control as a means of automatically changing reactor power to match demand, but the two-pass organization of the invention allows a wide range of control through control of the voids in the core, as for example, approximately 40% of full power can be controlled by varying the subcooling to each pass. The additional control needed, such as the 20% if an overall control range of 60% is had, will come from an automatic control rod system with the control rods 55 being provided in the reactor.

Between fuel loads, shim control rods may be used to bring the reactor power up to the minimum desired level, as from 0 to 40% power, and to compensate for slow reactivity changes due to fuel burnup, Xe and Sm buildup, and other fission product poison accumulation. Additional absorber rods are preferably incorporated in fuel assemblies of the reactor core to hold-down the excess reactivity. Some of these rods are removed during fuel reloading. When the equilibrium fuel cycle is reached, all of these poison shims will have been withdrawn from the fuel assemblies.

In a boiling water reactor, operating at constant pressure, the reactivity worth of the average void fraction $\bar{\alpha}_c$, will compensate for the excess reactivity in the reactor not compensated by rods. If the rods are not moved to change reactivity, then at constant pressure, the steady-state reactivity held in voids will remain constant when changes are made in the subcooling of the inlet water. Transiently, the reactivity or average core voids, will change, causing power to change in such a direction to make the reactivity held in voids (and for all practible purposes, the average core void, $\bar{\alpha}_c$,) equal to the original value.

Change in the effective subcooling of the reactor of the invention is accomplished by varying the ratio of the condensate or feedwater ($W_c$) returning from condenser 44 to the central or first pass 18 ($W_{c1}$) with respect to that returning to the peripheral or second pass 20 ($W_{c2}$). Although the temperature of the subcooled condensate water remains essentially constant with power, the reactivity worth of voids in the second pass is less than the reactivity worth of voids in the first pass, or in other words, the effect of a change of moderator density at the center of the reactor is much greater than the effect of a change of the same magnitude but opposite direction in the outer part of the reactor. Hence, putting more cold water in the first pass over-rides an opposing effect of putting less cold water in the second pass, and thus a change in total power output will occur with variation in the amount of condensate returned to each pass. For the full power condition of the reactor, the condensate ratio valve, V–2, will be initially set to proportion the feed water in a predetermined manner, as for example 65% condensate to the first pass (18) and 35% condensate to the second pass (20). This reference ratio can be changed by manually varying the reference input to the controller, C–2, through $V_{ref}$. If it is assumed that the ratio is changed so that the first-pass received 0% and the second pass received 100% of the condensate a substantial power decrease is obtained (as for example 40%) due to the change in the core voids in each pass. This change in power must occur in order to maintain the reactivity held in voids constant in the steady state case.

In accordance with the invention, control of the reactor over the full operating range is accomplished by a combination of feedwater proportioning and control rod movement with there being a number of control rods 55 employed and which are movable into and out of the core C–5 by the actuators 57 and are generally uniformly disposed throughout the transverse area of the core.

The control rod system is used as a manually operated system for reactor startup and shutdown and to shim the reactor for long-term reactivity changes due to fuel burnup, nuclear poisons, etc. with switch 62 being movable to connect with the manual control M for this purpose. One of the rods 55, preferably centrally located in the core, is used as an automatic control rod to maintain pressure constant in the reactor and to help match the reactor power to the turbine demand as described hereinafter with switch 62 engaging contact A for automatic control.

In order to maintain the rate at which reactivity is added in the reactor to a low value, only one control rod is allowed to operate at a time and its speed is limited to a low value. In addition to this velocity limitation, the total amount of reactivity controlled automatically is less than $0.7\% \Delta k/k$, to minimize the magnitude of a power rise due to malfunction of the automatic regulating control rod drive. The drives for all but the centermost rod may be of the rack and pinion type equipped with magnetic clutches which release causing the rods to scram downward upon receipt of a signal to do so. The centermost rod is preferably provided with an electric power drive to position it in the core.

The control system uses two servomechanisms to cause the reactor power to automatically match the turbine demand throughout the desired control range, as for example, the previously mentioned range of 40 to 100% full power.

The void control loop is a simple position type servomechanism which positions proportioning valve V–2 as a function of the turbine throttle position T. The throttle position represents flow or power demand for constant pressure, being automatically positioned through the automatic load demand device A'. A predetermined proportion, as for example, one half, of the change in turbine demand is met by positioning the proportioning valve V–2, as a direct function of throttle position in the predetermined range (40 to 100%) of full power. The reference position of the proportioning valve can be changed manually at any time to allow for a greater or lesser control by the voids. This is particularly advantageous if it is desired to operate the reactor for highest neutron economy. Since this control system allows a predetermined portion of the power demand to be met by void control, the automatic control rod will control the remainder as described later.

It should be noted that no control rod motion would be required in the upper part of the control range (as from 100 to 60% of full power) if the controller, C–2, of the valve V–2 were made to function as a proportioning servomechanism in which the final position of the valve was determined not by the throttle position but by zero error between turbine power demand and reactor power. In this case the void control system could control a certain percent of the full power (as about 40%) without control rod motion. Such a system would be very suitable for the turbine when the demand is adjusted manually through the manual adjustment M', since sufficient control is always available for normal reactor power changes. The control rods can be moved manually whenever the power demand is changed manually, to maintain the void control system in the most effective operating range.

The regulating rod control system is preferably designed to automatically control approximately $0.7\% \Delta k/k$ at a maximum reactivity of $0.01\% \Delta k/sec.$, with this automatic control being obtained through adjustment of the position of the control rod. A predetermined percentage of full power (such as 35%) can be controlled by this rod automatically. As embodied, the servo $S_o$ will position the control rod to hold the pressure of the reactor equal to the reference pressure $P_{ref}$. Since the reactor pressure $P_s$ will vary with demand, this is the only signal normally required for the servo, with this signal being received through the pressure responsive device 61 and controller 63. However, to obtain a faster response to changes in power demand, an additional signal is added to the pressure error. This signal is proportional to the rate of change of flow and is obtained by simply differentiating the steam flow $W_s$ through the device 64.

Under normal operation with automatic load demand $A^1$, a change in load will cause the throttle position T to changes. The control rods can be moved manually when change in the subcooling of the two passes because of the change in the position of the proportioning valve V–2 which follows the turbine throttle position through controller C–2. At the same time, the change in throttle position T causes a steam flow ($W_s$) change which automatically causes the centermost control rod to move as long as the flow is changing. If the stored energy in the reactor system plus the accumulated power changes due to the void and rod control systems cannot accommodate the change in demand the reactor or steam pressure ($P_s$) will start to change. This will cause a further adjustment of the control rod until both pressure and turbine demand are satisfied. The controls are such that if the load demand decreases a greater proportion of the feedwater will go to the second pass 20 and a less portion to first pass 18, and the centermost rod will be positioned further in the reactor core, while if the load demand increases an opposite action will take place.

In order to protect the reactor from damage due to high pressure, a bypass valve V–5 controlled by controller C–5 is included in the reactor control system. This valve is closed during normal operation of the turbine at its design pressure, as for example, 1250 p.s.i.g., but will bypass reactor steam whenever the turbine inlet pressure increases beyond a given pressure, such as 1270 p.s.i.g. The quantity of steam bypassed will be proportional to the increased pressure over normal pressure in order to maintain reactor pressure after the reactor power had decreased. The capacity of the valve V–5 will be such that when fully open it will be capable of passing an amount of steam in excess of the full power output of the reactor.

Because it is possible to get power transients in the reactor if the turbine throttle valve closes suddenly, the closure of this valve will immediately trip the bypass valve open and scram the reactor. As the power of the reactor drops, the pressure will fall and the bypass valve will start to close to maintain reactor pressure.

In addition to the reactivity control system, satisfactory operation of the plant control system is dependent on maintaining flows and water levels in various parts of the system.

The flow of total subcooled condensate $W_c$ returning to the reactor is controlled by a conventional throttling valve, V–1 through controller C–1 which receives its action signal from the difference between the flow of steam, $W_s$, to the turbine and the flow of total condensate $W_c$ to the reactor, with the condensate input to the reactor equaling the steam flow therefrom and with suitable sensing devices sensing these flows as diagrammatically illustrated.

In addition to making the steam flow $W_s$ equal to the condensate flow, $W_c$, the position of the throttling valve, V–1, is modified by a signal $L_3$, which is proportional to the difference between the reference level to be maintained in the condenser and the actual level.

The water levels $L_1$ in the reactor, and $L_2$ in the steam separator, are interdependent and are initially determined by the recirculating water rate, $W_r$, and the setting of the variable flow resistance of valve V–3 between the second pass 20 of the reactor and the steam separator drum. For a given recirculating rate, $W_r$, levels $L_1$ and $L_2$ will be determined by the difference in head required to overcome the pressure drop in the connecting line between the second pass and the steam separator drum. For a constant water recirculating rate this level will remain constant except for small variations due to changes in power which cause changes in the pressure drop in the second pass and between the second pass and the steam separator drum. Variation of the level $L_1$ and $L_2$ in the same direction, so that the differential level remains constant, must result in a change in level in the main turbine condenser hot well. Since this has a level controller associated with it, correction of $L_1$ and $L_2$ takes place by the correction of $L_3$.

High and low level alarms are also included at the reactor, steam separator, and main turbine condenser, forming part of the level sensing and controls mechanism at these locations to warn of any leakage in the water system or any malfunction of the controllers.

Although no automatic control of $L_1$ and $L_2$ has been incorporated in the ilustrative design, the adjustment of the levels may be had by manually varying the flow resistance valve at V–3, or the recirculating rate $W_r$, or, if desired automatic adjustment of valve V–3 and the recirculation rate may be provided. If automatic adjustment is used, the setting of valve V–3 is determined by controller 72 in such a way that there is a predetermined setting of V–3 for each position of the turbine admission valve. In this way the flow resistance of V–3 can be reduced by the desired amount as the steam flow increases with power level thereby compensating for the additional pressure drop in the second pass.

As was pointed out hereinbefore, changes in recirculating rate will change the level in the reactor. In addition, it will cause a variation in the power of the reactor. To maintain the recirculating water ($W_r$) constant, a variable speed drive is used on the recirculating pump 28 and controlled by the controller C–3. The control system for this drive maintains the recirculating water rate ($W_r$) constant and equal to the reference rate ($W_{ref}$) independent of the rate of condensate return with this system, sensing the difference between the flow ($W_1$) through the central portion and the proportion of the feedwater delivered to the central portion ($W_{c1}$) (by means of the diagrammatically illustrated devices) which difference represents the water recirculated ($W_r$) and comparing this with the reference flow $W_{ref}$ through control device 66 which, in turn, controls controller C–3.

If desired, adjustment in reactor power can be made by manually changing the recirculating water reference rate.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A boiling nuclear reactor including a core through which is conveyed a vaporizable liquid coolant, said core having an upright central portion and an upright annular portion disposed about said central portion, means to separate said central portion from said annular portion, means, including a pump, operative to establish a forced circulation of the liquid coolant through the central portion of the core and means operative to establish a natural circulation of this liquid coolant through said annular core portion.

2. A boiling water reactor including a core disposed within a suitable container through which water coolant is conveyed, said core having a vertically extending central section and a peripheral region partitioned from said central region and disposed thereabout to form a separate flow path, both of said flow paths communicating with the interior of the container and with both the central and peripheral regions having therein clad fuel members spaced to provide channels for flow of coolant therebetween, means for withdrawing steam from the upper region of the container, means, including a pump, operative to force water solely through said central region, passageway means operative to convey this water after its traversal of said central region to the lower end of the core for passage up through the peripheral region.

3. A boiling water nuclear reactor including an upright core disposed within a container through which water coolant is conveyed, means dividing the core into a vertically disposed central region through which the coolant may flow upwardly and an outer vertically disposed region separate from and disposed about said central region and also through which coolant may flow upwardly, with each of said regions having therein fuel members spaced for said upward passage of coolant, a circulating system for circulating the coolant through the core including pump means, said pump means having its outlet communicating with said central region of the core to force the coolant upward therethrough, means preventing coolant from the pump means from flowing through said outer region until it has traversed said central region, said outer region being open at its lower end to the interior of the container and means for conveying coolant in the container to the lower end of said outer region and directing the same up through said outer region.

4. The organization of claim 3 wherein the circulation system includes a drum disposed generally adjacent the elevation of the upper end of the core and operative to receive a steam and water mixture, said drum and the upper region of said container having vapor outlets.

5. The organization of claim 3 wherein the upper end of said outer region is closed with respect to the container interior but communicates with said circulating system.

6. The organization of claim 5 wherein the circulating system includes a drum disposed at an elevation substantially below the elevation of the upper end of said core, said drum and the upper region of said container having vapor outlets.

7. In a power plant system the combination of a boiling water nuclear reactor comprising a reactor core disposed within a container within which is contained water to a desired level, said core having vertically disposed passages therein for the passage of water and steam therethrough, means dividing the core into a centrally disposed vertical region and vertically disposed outer region about said central region, the upper end of the central region being open to the container interior and the lower end of said outer region being open to said container interior, means for withdrawing steam from the upper end of said container, means below the water level in the container operative to withdraw a steam and water mixture therefrom, a drum connected with the last mentioned means, means for withdrawing steam from said drum and conveying it to a suitable point of use, a circulating system for circulating water through said core, including pump means, operative to withdraw water from said drum and force it up through said central region, and means for preventing this withdrawn water traversing said outer region until it has traversed said central region.

8. In a power plant system the combination of a boiling water nuclear reactor having a core disposed in a container, said core having a central region and a separate outer region disposed thereabout, means for circulating water serially therethrough, means for supplying water below saturation temperature for initial passage through the central region, means for supplying said water for initial passage through the outer region and regulatable means for controlling these last two means and the introduction of water thereby to control the power output of the reactor.

9. A boiling water nuclear reactor system comprising a core disposed in a container, means for removing steam from the upper end of the container, said core having a vertically arranged central region and an outer region disposed thereabout with these regions being open at their upper ends to the container interior and having vertically extending passages for the passage of water therethrough, means for circulating water through said core, including pump means, operative to force water through said central region, a downcomer passageway for conveying water from the upper end of the core to the lower end for passage up through said outer region, means operative to deliver feed water below saturation temperature to the circulating system for initial passage through said central region, means operative to deliver said feed water to the system for initial passage through said outer region and means for controlling these last two means and the introduction of feedwater thereby to control the power output of the reactor.

10. A boiling water nuclear reactor system comprising a core disposed in a container, means for removing steam from the upper end of the container, said core having a vertically arranged central region and an outer region disposed thereabout, said central region being open at its upper end to the container interior and the upper end of the outer region being closed to the container interior, both of said regions having vertically extending passages for the passage of water therethrough, means for circulating water through said core, including pump means, operative to force water through said central region, and including means communicating with the upper region of said outer region, a downcomer passageway for conveying water from the upper end of the core to the lower end for passage up through said outer region, means operative to deliver feedwater below saturation temperature to the circulating system for initial passage through said central region, means operative to deliver said feedwater to the system for initial passage through said outer region and means for controlling these last two means and the introduction of feedwater thereby to control the power output of the reactor.

11. A boiling water nuclear reactor having a core through which water is passed with steam being generated during such passage, said core having a central region surrounded by an outer region, a circulating system for circulating water through the core including means for conveying water through the central region of the core with a portion of the water being converted to vapor during traversal of said central region, the outer region of the core being connected to receive the water egressing from said central region with a portion of the water being converted to vapor during traversal of said outer region, means for collecting the vapor generated in said central and outer regions and convey it to a point of use and means for controllably proportioning the delivery of subcooled feedwater between a location for initial passage through the central region and a location for initial passage through the outer region.

12. In a boiling water power reactor system wherein the reactor core is divided into a central region and a region disposed about the central region in surrounding relation therewith with means supplying subcooled feedwater to the system to make up for the steam developed therein and conveyed therefrom the method of regulating the power output of the reactor comprising delivering subcooled feedwater thereto so its initial passage through the core is through the central region, delivering subcooled feedwater thereto so its initial passage through the core is through the region disposed about the central region, controllably proportioning the feedwater delivery between these two delivery locations to control the power output of the reactor core, decreasing this output by providing a lesser proportion of the delivery for initial passage through the central region and increasing this output by providing a greater proportion of the delivery for initial passage through the central region.

13. A power plant system comprising a boiling water nuclear reactor having a core divided into at least a pair of regions one of which is disposed outwardly of another with the heat output from the fuel in said one region being greater than that from said other region, means for conveying water through said regions with a portion of the water being converted to steam during such passage, means conveying said steam to a suitable point of use, means for supplying subcooled feedwater to the reactor including adjustable means to proportion the water between at least two delivery locations such that at one location the initial traversal of the core by this water is through said one region and at the other location the initial traversal of the core by this water is through said other region, and means to control the proportioning means to regulate the proportioning of the feedwater.

14. A boiling water nuclear reactor including an upright core disposed within a container through which water coolant is conveyed, means dividing the core into a vertically disposed central region upwardly through which the coolant may flow and an outer vertically disposed region separate from and disposed about said central region and also upwardly through which coolant may flow, a circulating system for circulating the coolant through the core, including pump means, said pump means having its outlet communicating with said central region of the core to force the coolant upward therethrough, means preventing coolant from the pump means from flowing through said outer region until it has traversed said central region, said outer region being open at its lower end to the interior of the container and means for conveying coolant in the container to the lower end of said outer region, directing the same up through said outer region, with a portion of the coolant being vaporized during its traversal of the central and outer regions and with the vapor being conveyed to a desired point of use, means for supplying the coolant in a subcooled condition to the reactor at two locations one where this coolant initially traverses the core by passing through the central region and the other where it initially traverses the core by passing through the outer region, and means operative to controllably proportion the delivery of this coolant to these locations to regulate the power output of the reactor.

15. A power plant system comprising a boiling water nuclear reactor having a core divided into at least a pair of regions one of which is disposed outwardly of and surrounds another with the heat output from the fuel in said one region being greater than from that in said other region, control rod means associated with said core and adjustable to control the power output thereof, means for conveying water through said regions with a portion of the water being converted to steam during such passage, means conveying said steam to a suitable point of use, means for supplying subcooled feedwater to the reactor including adjustable means to proportion the water between at least two delivery locations such that at one location the initial traversal of the core by this water is through said one region and at the other location the initial traversal of the core by this water is through said other region, means to control the proportioning means to regulate the proportioning of the feedwater, and means operative to control the adjustment of the control rod means and the proportioning means to maintain the power output of the reactor at a desired value.

16. A power plant system comprising a boiling water nuclear reactor having a core divided into at least a pair of regions one of which is disposed outwardly of and surrounds another with the heat output from the fuel in said one region being greater than from that in said other region, control rod means associated with said core and adjustable to control the power output thereof, means for conveying water through said regions with a portion of the water being converted to steam during such passage, a prime mover supplying a load, means conveying said steam to said prime mover as the motive fluid thereof, means for supplying feedwater to the reactor including adjustable means to proportion the water between at least two delivery locations such that at one location the initial traversal of the core by this water is through said one region and at the other location the initial traversal of the core by this water is through said other region, and means to control the proportioning means to regulate the proportioning of the feedwater, means effectively responsive to the load on the prime mover and operative to adjust the proportioning of the feedwater to vary the power output in accordance therewith, and means responsive to the pressure of the steam operative to control adjustment of the control rod means to maintain said pressure at a desired value.

17. A boiling water nuclear reactor including an upright core disposed within a container through which water coolant flows, means dividing the core into a vertically disposed central region upwardly through which the coolant may flow and an outer vertically disposed region separate from and disposed about said central region and also upwardly through which coolant may flow, a circulating system for circulating the coolant through the core, including pump means, said pump means having its outlet communicating with said central region of the core to force the coolant upward therethrough, means preventing coolant from the pump from flowing through said outer region until it has traversed said central region, said outer region being open at its lower end to the interior of the container and means for conveying coolant in the container to the lower end of said outer region and directing the same up through said outer region, with a portion of the coolant being vaporized during its traversal of the central and outer regions, and means for supplying coolant to the reactor at two locations in a subcooled condition, one where this coolant initially traverses the core by passing through the central region and the other where it initially traverses the core by passing through the outer region, a prime mover supplied with vapor from the reactor means effectively responsive to the demand upon the prime mover and operative to controllably proportion the delivery of the coolant to these locations to regulate the power output of the reactor to tend to meet this demand, control rod means associated with said core and adjustable to control the power output of the core and means responsive to the vapor pressure to regulate said control rod means to maintain said pressure at a desired value.

18. In a boiling water nuclear reactor system wherein water is passed through the reactor core with a portion of the water being converted to steam that is delivered to a prime mover and wherein the reactor core is divided into a plurality of regions one disposed within another so that the heat ouput from the fuel in said one region is greater than from that in said other region with the core having adjustable control rod means to adjust the reactivity of the reactor, and with means supplying subcooled feedwater to the system to make up for the steam developed therein and conveyed from the reactor the method comprising proportioning the feedwater delivery between a first location where its initial passage through the core is through said one region and a second location where its initial passage through the core is through said other region, regulating the proportioning of the feedwater between these locations in response to the load on the prime mover so the steam supply is sufficient to meet said load by directing a greater proportion of the feedwater to said first location when the load increases and a lesser proportion to said first location when the load decreases, and regulating the control rod means in response to the pressure of the steam to maintain it at a desired value moving the rod means into the core when the pressure increases and out of the core when the pressure decreases.

19. A boiling water nuclear reactor comprising an upright vessel having a steam outlet at its upper end, a core through which water coolant flows mounted in the lower region of the vessel and having internested inner and outer portions, each of said portions being comprised of elongated fuel rods in spaced relation with the spaces therebetween providing passages for water and steam flow and with the rods in the inner portion being of substantially smaller transverse section and in substantially closer spacing than those in the outer portion, said inner and outer portions being in series flow relation with regard to coolant flow, means receiving a steam and water mixture from each region for separating the steam from the water, means for circulating water through the reactor comprising pump means operative to force water up through the inner portion, and means for conveying water up through the outer portion after traversal of the inner portion.

20. The organization of claim 19 wherein means are provided for introducing subcooled water at one location for initial passage through the outer core portion and at another location for initial passage through the inner core portion and means to adjustably control the admission of water at these two locations to control the power output of the reactor.

21. In a power plant system the combination of a boiling water nuclear reactor comprising a reactor core disposed within a container within which is contained water to a desired level, said core having vertically disposed passages therein for the passage of water and steam therethrough, means dividing the core into a centrally disposed vertical region and vertically disposed outer region about said central region, the upper end of the central region being open to the container interior and the lower end of said outer region being open to said container interior but the upper end being closed thereto, means for withdrawing steam from the upper end of said container, means operative to withdraw steam and water from the upper end of said outer region, a drum connected with the last mentioned means, means for withdrawing steam from said drum and conveying it to a suitable point of use, a circulating system for circulating water through said core, including pump means operative to withdraw water from said drum and force it up through said central region, and means for preventing this water traversing said outer region until it has traversed said central region.

22. The organization of claim 21 wherein the level of the drum is substantially below the water level of the container during operation.

23. A boiling water nuclear reactor having a core through which water coolant flows and that is comprised of internested regions disposed successively outward from the center of the core and in each of which boiling takes place, a circulating system connected so the coolant flows serially through the several regions and including separate means operative to receive the steam and water mixture from each region and separate the steam from the water and means to convey the thus separated steam to a point of use.

24. A boiling water nuclear reactor having a core through which water coolant is conveyed, said core disposed in a suitable container with the core being comprised of internested regions disposed successively outward from the center of the core with each region extending throughout the length of the core, means operative to serially pass the coolant through the several regions including a pump effective to force the coolant through the central most region and separate means to receive the steam and water mixture from each region operative to separate the steam from the water, this last named means including a drum disposed exteriorly of the core container and connected to receive the steam and water mixture from one of said regions, and means operative to convey the thus separated steam to a point of use.

25. A boiling water nuclear reactor having an upright core disposed within a suitable container and through which water coolant is conveyed, said core having at least a pair of separate flow paths for water with the paths being in internested relation, means operative to separately direct the water through each flow path, said means being interconnected in successive relation so the water serially flows through the several paths, and means operative to provide a more positive flow of the water through the centermost flow path than through the flow paths disposed thereabout.

26. A boiling water nuclear reactor having an upright core disposed within a suitable container and through which water is conveyed as coolant, said core having at least a pair of separate flow paths for coolant with the paths being in internested relation, means operative to separately direct the coolant through each flow path, separate means to receive the steam and water mixture from each flow path and operative to effect a separation of the steam and water issuing therefrom, the first mentioned means being interconnected in successive relation so the coolant serially flows through the several flow paths, and means operative to provide a more positive flow of the coolant through the centermost flow path than the flow paths disposed thereabout.

27. In a boiling water nuclear reactor which is supplied with subcooled feed water the method of operation comprising proportioning the introduction of feed water between separate locations and directing the feed water from these separate locations for initial passage through regions of the core which respectively have different power densities, and regulating the power output of the reactor by regulating the proportioning of the feed water with the power output increasing with a change in the proportioning in favor of the region of greater power density.

28. The method comprising generating heat via a nuclear chain reaction in a predetermined zone, establishing a circulation of water, pumping said water through a central portion of said zone, supplying sufficient heat to said water in passing through said central portion to vaporize a portion thereof, receiving the steam and water mixture thus produced and separating the steam from the remaining water, conveying this remaining water through said zone at a location outwardly of said central portion where the power density is decreased and in a less positive manner than through said central zone and supplying sufficient heat thereto to vaporize a portion thereof, and receiving the steam and water mixture thus produced and separating the steam from the remaining water.

29. The method of claim 28 comprising separating the steam from the water in the mixture produced in said central portion of said zone at one location and the steam from the water in the mixture produced outwardly of said central portion at a different location.

30. A boiling water nuclear reactor having a core, means dividing said core into separate regions in each of which boiling takes place, separate means receiving the steam and water mixture from the separate regions and within which means separation of the steam and water takes place, and means for conveying the thus separated steam to a point of use.

References Cited by the Examiner
UNITED STATES PATENTS

| | | | |
|---|---|---|---|
| 2,861,033 | 11/1958 | Treshow | 204—193.3 |
| 2,938,845 | 5/1960 | Treshow | 204—193.26 X |
| 2,986,508 | 5/1961 | Vernon et al. | 204—193.2 |
| 2,990,348 | 6/1961 | Woolan | 204—154.2 |
| 2,998,367 | 8/1961 | Untermyer | 204—154.26 X |
| 3,022,235 | 2/1962 | Brown et al. | 204—193.2 |

FOREIGN PATENTS

| | | |
|---|---|---|
| 555,400 | 1/1957 | Italy. |
| 1,027,338 | 4/1958 | Germany. |
| 799,725 | 8/1958 | Great Britain. |
| 1,168,933 | 9/1958 | France. |
| 1,221,255 | 6/1960 | France. |
| 1,248,367 | 10/1960 | France. |

OTHER REFERENCES

Nucleonics, vol. 14, No. 4. April 1956, pp. 106–109.

DEWAYNE RUTLEDGE, *Primary Examiner.*

ROBERT L. CAMPBELL, LEON D. ROSDOL, CARL D. QUARFORTH, *Examiners.*

S. F. STONE, W. T. HOUGH, P. G. BETHERS,
*Assistant Examiners.*

UNITED STATES PATENT OFFICE
CERTIFICATE OF CORRECTION

Patent No. 3,284,312                        November 8, 1966

John M. West

It is hereby certified that error appears in the above numbered patent requiring correction and that the said Letters Patent should read as corrected below.

Column 5, line 38, for "as" read -- an --; column 6, line 33, for "practible" read -- practicable --; column 7, line 63, after "reactivity" insert -- rate --; column 8, line 5, for "changes. The control rods can be moved manually when" read -- change. This change will be reflected as an automatic --; column 9, line 11, for "ilustrative" read -- illustrative --.

Signed and sealed this 12th day of September 1967.

(SEAL)
Attest:

ERNEST W. SWIDER                            EDWARD J. BRENNER
Attesting Officer                                Commissioner of Patents